United States Patent
Ozbilgin et al.

(10) Patent No.: US 11,435,752 B2
(45) Date of Patent: Sep. 6, 2022

(54) DATA FUSION SYSTEM FOR A VEHICLE EQUIPPED WITH UNSYNCHRONIZED PERCEPTION SENSORS

(71) Applicant: Motional AD LLC, Boston, MA (US)

(72) Inventors: Guchan Ozbilgin, Pittsburgh, PA (US); Wenda Xu, Pittsburgh, PA (US); Jarrod M. Snider, Clairton, PA (US); Yimu Wang, Pittsburgh, PA (US); Yifan Yang, Pittsburgh, PA (US); Junqing Wei, Bridgeville, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 15/935,796

(22) Filed: Mar. 26, 2018

(65) Prior Publication Data

US 2019/0294176 A1 Sep. 26, 2019

Related U.S. Application Data

(60) Provisional application No. 62/647,135, filed on Mar. 23, 2018.

(51) Int. Cl.
*G05D 1/02* (2020.01)
*G05D 1/00* (2006.01)
*G06T 7/70* (2017.01)

(52) U.S. Cl.
CPC ......... *G05D 1/0246* (2013.01); *G05D 1/0088* (2013.01); *G05D 1/0257* (2013.01);
(Continued)

(58) Field of Classification Search
CPC ........ G06K 9/6289; G06T 2207/10016; G06T 2207/20221; G06T 2207/30252; G05D 1/0088; G05D 1/0246; G05D 1/0257
See application file for complete search history.

(56) References Cited

U.S. PATENT DOCUMENTS

| 8,896,480 B1 | 11/2014 | Wilson et al. |
| 2005/0094869 A1 | 5/2005 | Yoda et al. |

(Continued)

FOREIGN PATENT DOCUMENTS

| CN | 106908783 | 6/2017 |
| EP | 3211368 | 8/2017 |
| WO | WO2017122529 | 7/2017 |

OTHER PUBLICATIONS

Danish Search Opinion in Danish Application No. PA201870718, dated Feb. 1, 2019, 6 pages.
(Continued)

*Primary Examiner* — Anshul Sood
(74) *Attorney, Agent, or Firm* — Fish & Richardson P.C.

(57) ABSTRACT

A sensor data fusion system for a vehicle with multiple sensors includes a first-sensor, a second-sensor, and a controller-circuit. The first-sensor is configured to output a first-frame of data and a subsequent-frame of data indicative of objects present in a first-field-of-view. The first-frame is characterized by a first-time-stamp, the subsequent-frame of data characterized by a subsequent-time-stamp different from the first-time-stamp. The second-sensor is configured to output a second-frame of data indicative of objects present in a second-field-of-view that overlaps the first-field-of-view. The second-frame is characterized by a second-time-stamp temporally located between the first-time-stamp and the subsequent-time-stamp. The controller-circuit is configured to synthesize an interpolated-frame from the first-frame and the subsequent-frame. The interpolated-frame is characterized by an interpolated-time-stamp that corresponds to the second-time-stamp. The controller-circuit fuses the interpolated-frame with the second-frame to provide a fused-frame of data characterized by the interpolated- (Continued)

time-stamp, and operates the host-vehicle in accordance with the fused-frame.

16 Claims, 4 Drawing Sheets

(52) U.S. Cl.
CPC ....... *G06T 7/70* (2017.01); *G05D 2201/0213* (2013.01); *G06T 2207/10016* (2013.01); *G06T 2207/20221* (2013.01); *G06T 2207/30252* (2013.01)

(56) References Cited

U.S. PATENT DOCUMENTS

| | | |
|---|---|---|
| 2015/0332441 A1 | 11/2015 | Hogasten et al. |
| 2016/0209236 A1* | 7/2016 | Steinhardt ............ G01C 21/165 |
| 2017/0094252 A1* | 3/2017 | Bleiweiss .......... G06K 9/00375 |
| 2017/0148168 A1 | 5/2017 | Lindner et al. |
| 2017/0168494 A1 | 6/2017 | Sibenac et al. |
| 2017/0242442 A1* | 8/2017 | Minster ................ G06T 7/32 |

OTHER PUBLICATIONS

DK 2nd Search Opinion in Danish Appln. No. PA201870718, dated Jul. 2, 2019, 6 pages.
DK 3rd Search Report in Danish Appln. No. PA201870718, dated Jan. 30, 2020, 3 pages.
DK 4th Technical Examination in Danish Appln. No. PA201870718, dated Apr. 1, 2020, 3 pages.
DK 5th Technical Examination in Danish Appln. No. PA201870718, dated Apr. 30, 2020, 2 pages.
DK 6th Technical Examination in Danish Appln. No. PA201870718, dated Aug. 14, 2020, 2 pages.

* cited by examiner

DATA FUSION SYSTEM FOR A VEHICLE EQUIPPED WITH UNSYNCHRONIZED PERCEPTION SENSORS

TECHNICAL FIELD OF INVENTION

This disclosure generally relates to a sensor data fusion system for a vehicle with multiple sensors, and more particularly relates to a system that synthesizes an interpolated-frame from a first-frame and a subsequent-frame of data from a first sensor, where the interpolated-frame is characterized by an interpolated-time-stamp that corresponds to a second-time-stamp of a second-frame of data from a second-sensor.

BACKGROUND OF INVENTION

It is known to equip a vehicle with multiple different sensors that are based on different technologies, e.g. camera, radar, and/or lidar. These different sensors may operate independently so that the frames of data (e.g. images from the camera, radar-maps from the radar, point-clouds from the lidar) may not be temporally synchronized, i.e. the frames may be rendered or captured at different instants in time. The fusing of the unsynchronized frames to form, for example, a three-dimensional (3D) model of the environment around the vehicle may introduce unacceptable errors in the 3D model.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
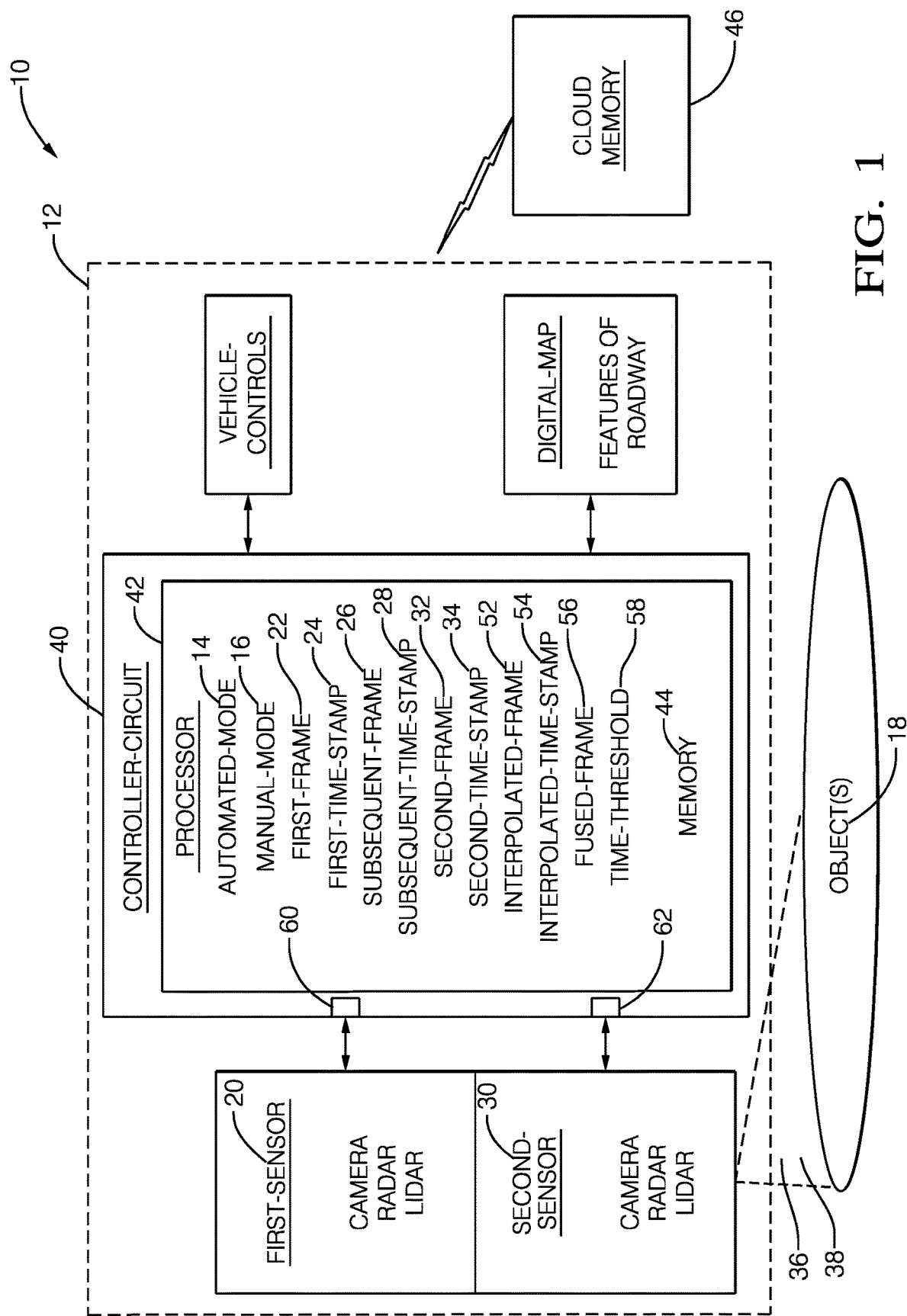
FIG. 1 is a diagram of a sensor data fusion system in accordance with one embodiment.

FIG. 1 illustrates a non-limiting example of a sensor data fusion system 10, here after often referred to as the system 10, which is intended for us by an automated vehicle, e.g. a host-vehicle 12, that is equipped with multiple sensors. In general, a key function of the system 10 is the synthesizing and fusion of sensor data from multiple sensors by interpolating data to a particular instant in time. The host-vehicle 12 may be characterized as an automated vehicle. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode 16 where the degree or level of automation may be little more than providing an audible and/or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as another-vehicle, a pedestrian, or a road sign.

Figure 2:
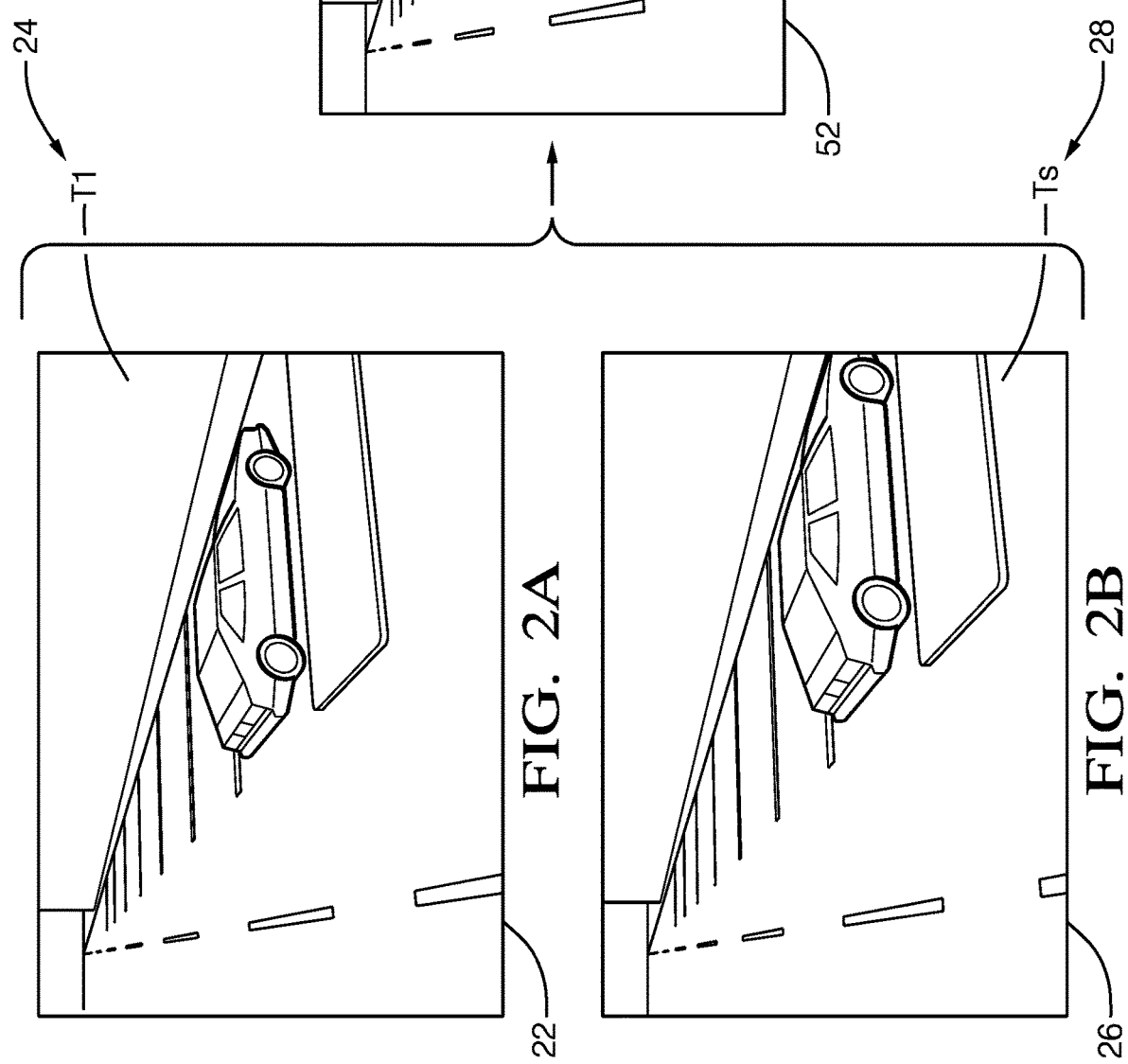
FIGS. 2A and 2B are images captured by the system of FIG. 1 in accordance with one embodiment.
FIG. 2C is an image synthesized by the system of FIG. 1 from FIGS. 2A and 2B.

The system 10 includes a first-sensor 20, for example, e.g. a camera, a radar-unit or a lidar-unit, that is mounted on the host-vehicle 12. The first-sensor 20 is configured to output a first-frame 22 of data and a subsequent-frame 26 of data indicative of objects 18 present in a first-field-of-view 36. As used herein, the phrase "frame of data" is used to refer to an image from a camera, a radar-map from a radar-unit, or a point-cloud from a lidar-unit associated with some specific instant in time. The first-frame 22 is characterized by a first-time-stamp 24 (T1 in FIG. 2A), and the subsequent-frame 26 of data characterized by a subsequent-time-stamp 28 (Ts in FIG. 2B) that is different from the first-time-stamp 24. For this discussion, it will be assumed that the first-time-stamp 24 is indicative of an instant in time that is earlier than or before the instant in time indicated by the subsequent-time-stamp 28. By way of example and not limitation, if the first-sensor 20 is a camera, and the camera is capturing images a rate of ten frames per second (10 fps), then the subsequent-time-stamp 28 would be indicative of an instant in time that was ⅒ of a second (0.1 seconds) after the first-time-stamp 24. For example, if the first-time-stamp 24 is arbitrarily set to zero (0), then the subsequent-time-stamp 28 would be equal to 0.1 seconds.

The system 10 also includes a second-sensor 30, e.g. a camera, a radar-unit or a lidar-unit, that is mounted on the host-vehicle 12. The second-sensor 30 is configured to output a second-frame 32 of data indicative of objects 18 present in a second-field-of-view 38 that overlaps (partially or fully, covering an area larger than or smaller than) the first-field-of-view 36. For example, both the first-sensor 20 and the second-sensor 30 may view an area forward of the host-vehicle, but the first-field-of-view 36 may be wider or narrower than the second-field-of-view 38. However, both the first-sensor 20 and the second-sensor 30 detect instances of the objects 18 that are in the travel-path of the host-vehicle 12. That is, one of the sensors may detect more or fewer objects than the other because of a difference in the respective fields-of-view, but both sensors have sufficient fields-of-view to detect instances of the objects 18 with which the host-vehicle 12 could collide.

Figure 3:
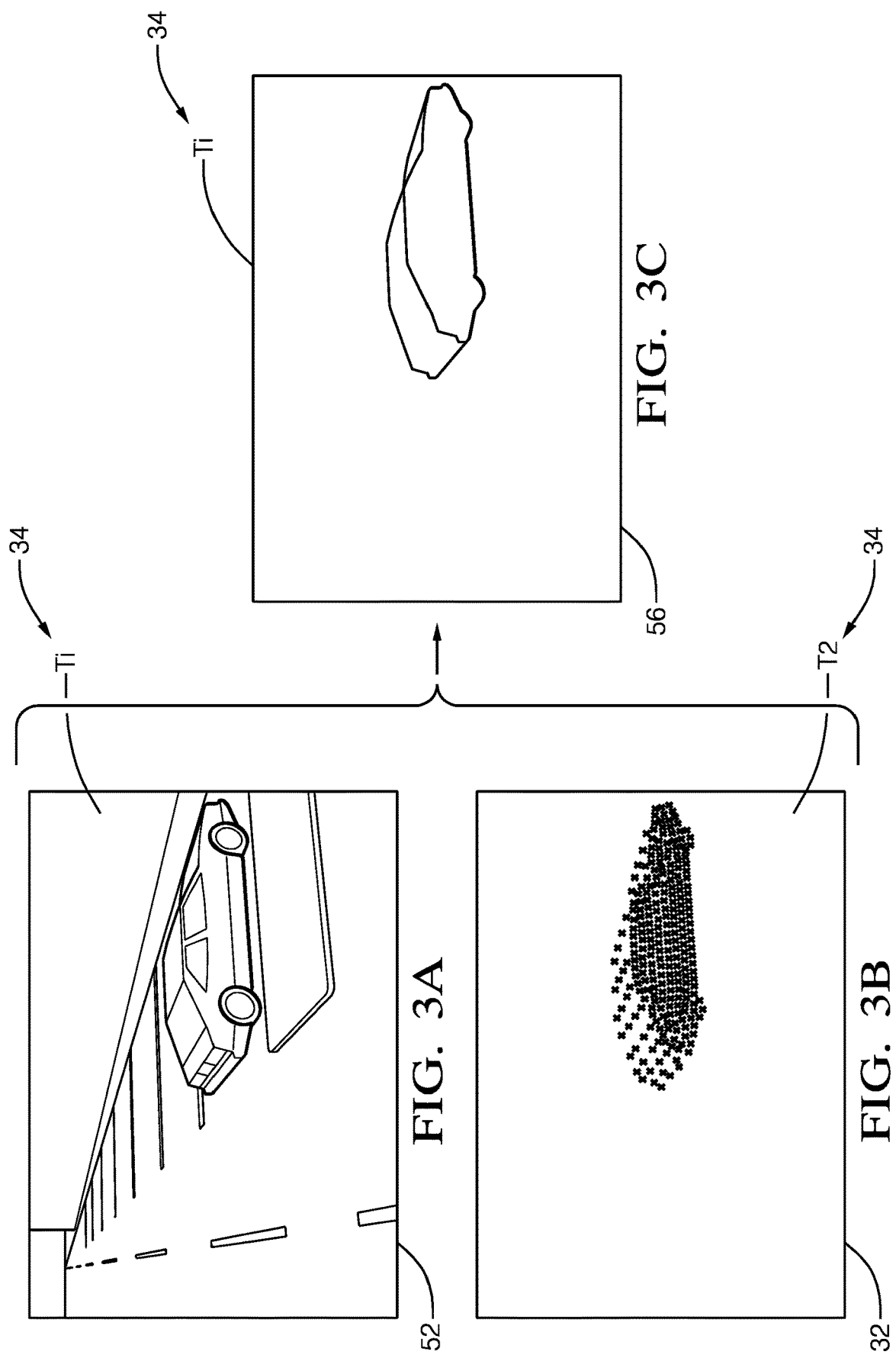
FIG. 3A is an image synthesized by the system of FIG. 1 in accordance with one embodiment.
FIG. 3B is cloud-point from a lidar of the system of FIG. 1 in accordance with one embodiment.
FIG. 3C is a three-dimensional model formed by fusing the image of FIG. 3A with the cloud-point of FIG. 3B by the system of FIG. 1 in accordance with one embodiment.

The second-frame 32 is characterized by a second-time-stamp 34 (T2 in FIG. 3B) that is temporally located between the first-time-stamp 24 and the subsequent-time-stamp 28. Because different sensing technologies (e.g. camera, radar, lidar) typically have different frame-rates, the first-sensor 20 and the second-sensor may not be synchronized. That is, the first-sensor 20 may be based on a first-sensing-technology (e.g. camera with an image-detector), and the second-sensor 30 is based on a second-sensing-technology (e.g. lidar using a scanning laser range finder) that is different from the first-sensing-technology.

For example, the second-time-stamp 34 may correspond to an instant in time that is after the first-time-stamp 24 and before the subsequent-time-stamp 28. As a specific non-limiting example, if the first-time-stamp 24 is zero (0) and the subsequent-time-stamp 28 is 0.1 seconds as suggested above for the first-sensor 20 being a camera, the second-sensor 30 may be a lidar-unit and the second-time-stamp 34 may be 0.04 seconds. As will be explained in more detail below, the system 10 described herein provides a way for data from the first-sensor 20 and the second-sensor 30 to be effectively synchronized so that data from different sensing technologies can be readily fused, i.e. combined using any of a variety of known data fusion techniques so that, for example, a three-dimensional (3D) model of the objects 18 can be rendered.

The system 10 also includes a controller-circuit 40 in communication with the first-sensor 20 and the second-sensor 30. The communication may be by way of, for example, wires, optical cable, or wireless communication as will be recognized by those in the electronics arts. The controller-circuit 40, hereafter sometimes referred to as the controller 40, may include one or more instances of a processor 42 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 40, it is recognized that the functions of the controller 40 may be shared or distributed among several instances of controllers that are each configured for some specific task. Hereafter, any reference to the controller 40 being configured for something is to also be interpreted as suggesting that the processor 42 may alternatively be configured for the same thing. The controller 40 may include memory 44, i.e. non-transitory computer-readable storage-medium, including non-volatile memory, such as electrically erasable programmable read-only memory (EEPROM) for storing one or more routines, thresholds, and captured data. The memory 44 may be part of the processor 42, or part of the controller 40, or separate from the controller 40 such as remote memory stored in the cloud, e.g. the cloud memory 46. The one or more routines may be executed by the controller 40 or the processor 42 to perform steps for processing the first-frame 22, the subsequent-frame 26 and the second-frame 32 as described herein.

As introduced above, the first-frame 22 is characterized by a first-time-stamp 24 (T1 in FIG. 2A), the subsequent-frame 26 of data characterized by a subsequent-time-stamp 28 (Ts in FIG. 2B) that is temporally after the first-time-stamp 24, and the second-frame 32 is characterized by a second-time-stamp 34 (T2 in FIG. 3B) that is temporally located between the first-time-stamp 24 and the subsequent-time-stamp 28. To perform data fusion of data from the first-sensor 20, e.g. images from a camera, with data from the second-sensor, e.g. a cloud-point from a lidar-unit, the data is preferable temporally synchronized so that the image and cloud-point that are fused are from the same (as close as possible) instant in time. If it is not possible to synchronize the hardware, i.e. synchronize the first-sensor 20 and the second-sensor 30, then the system 10 described herein is able to overcome that lack of synchronization as described below.

FIGS. 2A and 2B are non-limiting examples of, respectively, the first-frame 22 rendered at time T1 (the first-time-stamp 24) and the subsequent-frame 26 rendered at time Ts (the subsequent-time-stamp 28), both of which are images from a camera that in this example is the first-sensor 20. FIG. 3B is a non-limiting example of the second-frame 32 rendered at time T2 (the second-time-stamp 34), which is a point-cloud from a lidar-unit that in this example is the second-sensor 30. First, the system 10 needs an image that is (temporally) synchronized with the point-cloud from the lidar. Motion-flow-analysis or other known image processing techniques can be used to synthesize an interpolated-frame 52 (FIG. 2C) that has an interpolated-time-stamp 54 that corresponds to, i.e. is essentially equal to, the second-time-stamp 34 of the second-frame 32 (FIG. 3B).

Accordingly, the controller-circuit 40 (or the processor 42) is configured to synthesize the interpolated-frame 52 from the first-frame 22 and the subsequent-frame 26. The interpolated-frame 52 characterized by the interpolated-time-stamp 54 that corresponds to the second-time-stamp 34. I.e., the interpolated-time-stamp 54 and the second-time-stamp 34 are essentially or approximately or exactly equal so that image of the interpolated-frame 52 is temporally synchronized with the point-cloud of the second-frame 32.

While the example given here is for interpolating images to synthesize the interpolated-frame 52, it is recognized that motion-flow-analysis and other know radar-map and point-cloud processing techniques can be used to synthesize the interpolated-frame 52 when the first-sensor 20 is a radar-unit or a lidar-unit rather than a camera.

It is contemplated that in some instances the difference in time between the first-time-stamp 24 and the second-time-stamp 34 or the difference in time between the subsequent-time-stamp 28 and the second-time-stamp 34 is so small that there is no substantive advantage to performing an interpolation of the first-frame 22 and the subsequent-frame 26. For example, if the first-time-stamp 24 is very close to the second-time-stamp 34, e.g. the difference is less than five milliseconds (5 ms), the interpolated-frame 52 may simply be made the same as the first-frame 22 to avoid wasting computation time by the controller 40 or the processor 42. Accordingly, the controller-circuit 40 (or the processor 42) may be configured to synthesize the interpolated-frame 52 only in response to a determination that both the first-time-stamp 24 and the subsequent-time-stamp 28 differ from the second-time-stamp 34 by greater than a time-threshold 58, e.g. five milliseconds (5 ms).

FIG. 3A in this example is the same image or illustration as FIG. 2C. However, it is contemplated that FIG. 3A could be a cropped version of FIG. 2C if the first-field-of-view 36 of the first-sensor 20 is greater (e.g. wider) than the second-field-of-view 38 of the second-sensor 30. Contrarywise, FIG. 3B could be a cropped version of what is provided by the second-sensor 30 if first-field-of-view 36 is smaller (e.g. narrower) than the second-field-of-view 38.

FIG. 3C is an illustration of a three-dimensional (3D) model that is the result of fusing the image in FIG. 3A with the point-cloud in FIG. 3B. The details of how an image can be fused with a point-cloud to provides some alternative form of information, e.g. a 3D model, are described in numerous technical papers and books related to the subject of sensor data fusion.

Accordingly, the controller-circuit 40 (or the processor 42) is further configured to fuse the interpolated-frame 52 with the second-frame 32 to provide a fused-frame 56 of data characterized by the interpolated-time-stamp 54. That is, the instant in time represented by the fused-frame 56 shown in FIG. 3C corresponds to the interpolated-time-stamp 54 which is equal to or approximately equal to the second-time-stamp 34.

The controller 40 is further configured to operate the host-vehicle 12 in accordance with the fused-frame 56. If the host-vehicle 12 is being operated in the automate-mode 14, then the controller 40 operates the vehicle-controls (e.g. steering, brakes, accelerator) to control the speed and steerage of the host-vehicle 12 to at least avoid a collision with the other-vehicle depicted in FIGS. 2A-3C. Operating the host-vehicle 12 may include consulting a digital-map to determine or have knowledge of features of the roadway traveled by the host-vehicle 12, as will be recognized by those in automated vehicle arts.

The controller 40 includes a first-input 60 configured to communicate with the first-sensor 20 and a second-input 62 configured to communicate with the second-sensor 62. The first-input 60 and the second-input 62 may each be a wireless transceiver if wireless communications are being used to communicate with the first-sensor 20 and a second-input 62, or a digital-interface such as a controller-area-network (CAN) transceiver if a wired connection is being used, as will be recognized by those in the art. The first-input 60 and the second-input 62 may each be operated by the processor 42 to control the communications with the first-sensor 20 and the second-sensor 30

Figure 4:
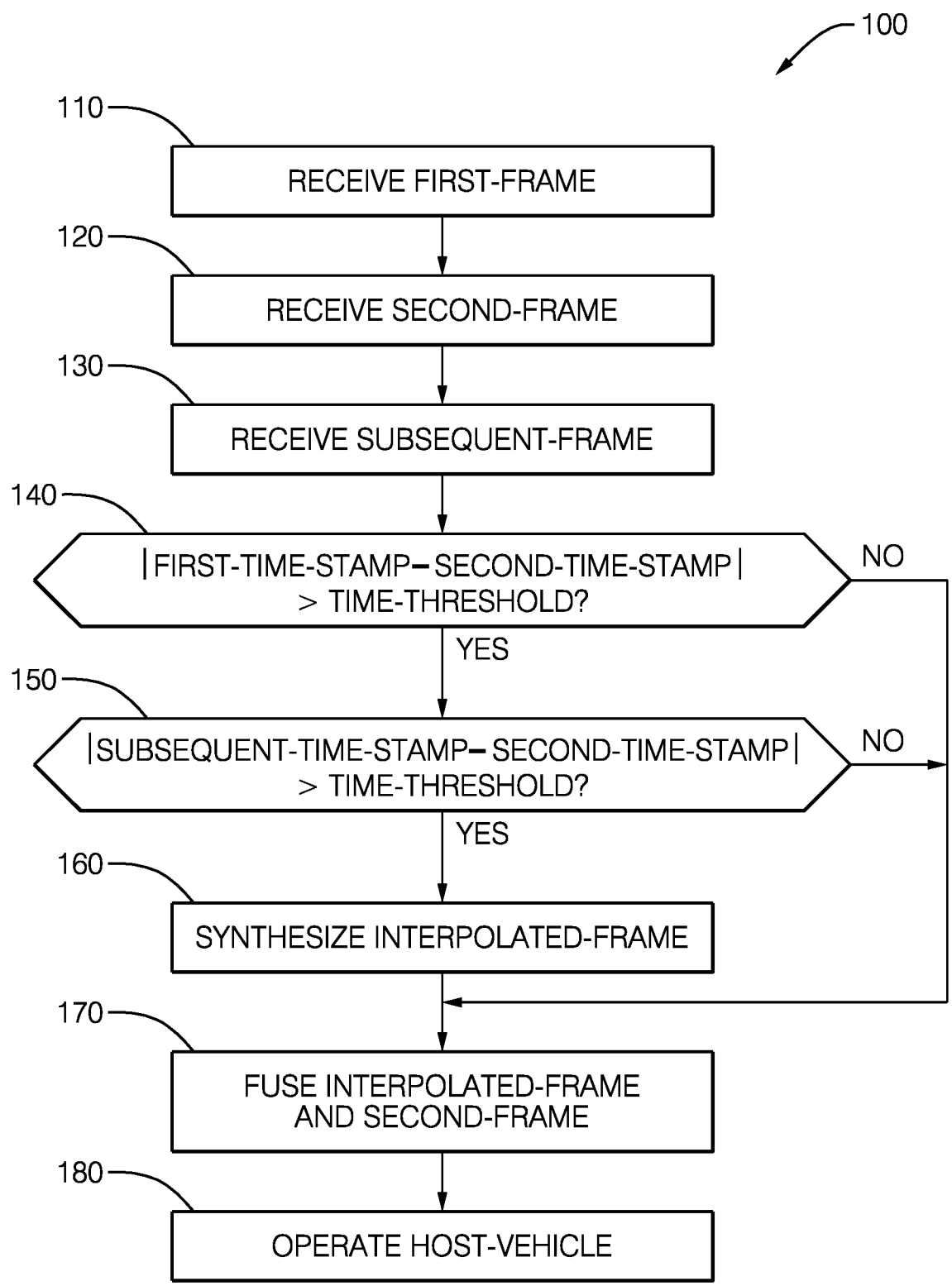
FIG. 4 is a method of operating the system of FIG. 1 in accordance with one embodiment.

FIG. 4 illustrates a non-limiting example of a method 100 of operating a sensor data fusion system 10 for a vehicle with multiple sensors, e.g. the first-sensor 20 and the second-sensor 30.

Step 110, RECEIVE FIRST-FRAME, may include receiving a first-frame 22 of data from the first-sensor 20 mounted on a host-vehicle 12. The first-frame 22 of data is indicative of objects 18 present in a first-field-of-view 36 of the first-sensor 20. The first-frame 22 is characterized by a first-time-stamp 24, which indicates a time that the first-frame 22 was rendered.

Step 120, RECEIVE SECOND-FRAME, may include receiving a second-frame 32 of data from a second-sensor 30 mounted on the host-vehicle 12, said second-frame of data indicative of objects 18 present in a second-field-of-view 38 of the second-sensor 30. The second-field-of-view 38 overlaps the first-field-of-view 36, said second-frame characterized by a second-time-stamp temporally located after the first-time-stamp 24.

Step 130, RECEIVE SUBSEQUENT-FRAME, may include receiving a subsequent-frame 26 of data from the first-sensor 20 mounted on a host-vehicle. The subsequent-frame 26 of data is indicative of objects 18 present in the first-field-of-view 36. The subsequent-frame 26 of data is characterized by a subsequent-time-stamp 28 that is after the first-time-stamp 24 and the second-time-stamp 34.

Step 140, |FIRST-TIME-STAMP−SECOND-TIME-STAMP|>TIME-THRESHOLD?, and step 150, |SUBSEQUENT-TIME-STAMP−SECOND-TIME-STAMP|>TIME-THRESHOLD? are optional steps that may force or inhibit the synthesizing an interpolated-frame 52 to only when there is a determination that both the first-time-stamp 24 and the subsequent-time-stamp 28 differ from the second-time-stamp 34 by greater than a time-threshold 58. That is, step 160 (synthesizing the interpolated-frame 52) may only be performed if there is a substantive difference (e.g. greater that the time-threshold 58) between the first-time-stamp 24 and the second-time-stamp 34, and there is a substantive difference between the subsequent-time-stamp 28 and the second-time-stamp 34.

Step 160, SYNTHESIZE INTERPOLATED-FRAME, may include synthesizing an interpolated-frame 52 from the first-frame 22 and the subsequent-frame 26. The interpolated-frame 52 is characterized by an interpolated-time-stamp 55 that corresponds (i.e. is equal to or approximately equal to) to the second-time-stamp 34. The techniques for interpolating two images from a camera, or two radar-maps from a radar-unit, or two point-clouds from a lidar are known to those in the sensor processing arts.

Step 170, FUSE INTERPOLATED-FRAME AND SECOND-FRAME, may include fusing the interpolated-frame 52 with the second-frame 32 to provide a fused-frame 56 of data that is characterized by (i.e. is indicative of an instant in time that corresponds to) the interpolated-time-stamp 54.

Step 180, OPERATE HOST-VEHICLE, may include operating the vehicle-controls (e.g. steering, brakes, accelerator) of the host-vehicle 12 in accordance with the fused-frame 56 if/when the host-vehicle 12 is being operated in the automated-mode 14. For example, the controller 40 may steer the host-vehicle 12 to avoid colliding with the other-vehicle depicted in the fused-frame 56. If the host-vehicle 12 is being operated in the manual-mode 16, the controller 40 may operate a speaker within the host-vehicle 12 to warn an operator (not shown) of the host-vehicle 12 that the present trajectory of the host-vehicle 12 may lead to a collision with the other-vehicle.

Described herein is a first device 40 that includes one or more processors 42, memory 44, and one or more programs 100 stored in the memory 44, where the one or more programs 100 including instructions for performing all or part of the method 100. Also, described herein is a non-transitory computer-readable storage-medium 44 that includes one or more programs 100 for execution by one or more processors 42 of a first device 40. The one or more programs 100 including instructions which, when executed by the one or more processors 42, cause the first device 40 to perform all or part of the method 100.

Accordingly, a sensor data fusion system (the system 10), a controller 40 for the system 10, and a method 100 of operating the system 10 are provided. The system 10, the controller 40, and the method 100 overcome the problem of fusing data from various sensors (e.g. camera, radar, lidar) when the data from those sensors is not temporally synchronized.

While this invention has been described in terms of the preferred embodiments thereof, it is not intended to be so limited, but rather only to the extent set forth in the claims that follow.

We claim:

1. A sensor data fusion system for a host-vehicle with multiple sensors, said system comprising:
   a camera mounted on the host-vehicle, said camera configured to output a first-frame of camera data and a subsequent-frame of camera data indicative of objects present in a first-field-of-view, said first-frame of camera data characterized by a first-time-stamp, said subsequent-frame of camera data characterized by a subsequent-time-stamp different from the first-time-stamp;
   a LiDAR mounted on the host-vehicle, said LiDAR configured to output a second-frame of point-cloud data indicative of objects present in a second-field-of-view that overlaps the first-field-of-view, said second-frame of point-cloud data characterized by a second-time-stamp temporally located between the first-time-stamp and the subsequent-time-stamp; and
   a controller-circuit in communication with the camera and the LiDAR, said controller-circuit configured to:
   synthesize an interpolated-frame from the first-frame and the subsequent-frame using motion flow analysis responsive to determining that both the first-time-stamp and the subsequent-time-stamp differ from the second-time-stamp by greater than a time-threshold, said interpolated-frame characterized by an interpolated-time-stamp that corresponds to the second-time-stamp, such that the interpolated-frame is temporally synchronized with the point-cloud data of the second-frame;
   fuse the interpolated-frame with the second-frame to provide a fused-frame of data characterized by the interpolated-time-stamp;
   determine a three-dimensional model of an environment surrounding the host-vehicle based on the fused-frame; and
   operate the host-vehicle in accordance with the three-dimensional model of the environment.

2. The system of claim 1, wherein the objects present in the first-field-of-view are in a travel path of the host-vehicle.

3. The system of claim 1, wherein the objects present in the second-field-of-view are in a travel path of the host-vehicle.

4. The system of claim 1, wherein the controller-circuit is further configured to:
   synthesize the interpolated-frame from the first-frame responsive to determining that the first-time-stamp and the subsequent-time-stamp differ from the second-time-stamp by less than five milliseconds, wherein the interpolated-frame is the same as the first-frame.

5. A controller-circuit for a sensor data fusion system for a host-vehicle with multiple sensors, said controller-circuit comprising:
   a first-input configured to communicate with a camera mounted on the host-vehicle, said camera configured to output a first-frame of camera data and a subsequent-frame of camera data indicative of objects present in a first-field-of-view, said first-frame of camera data characterized by a first-time-stamp, said subsequent-frame of camera data characterized by a subsequent-time-stamp different from the first-time-stamp;
   a second-input configured to communicate with a LiDAR mounted on the host-vehicle, said LiDAR configured to output a second-frame of point-cloud data indicative of objects present in a second-field-of-view that overlaps the first-field-of-view, said second-frame of point-cloud data characterized by a second-time-stamp temporally located between the first-time-stamp and the subsequent-time-stamp; and
   a processor in communication with the camera and the LiDAR, said processor configured to:
   synthesize an interpolated-frame from the first-frame and the subsequent-frame using motion flow analysis responsive to determining that the both the first-time-stamp and the subsequent-time-stamp differ from the second-time-stamp by greater than a time-threshold, said interpolated-frame characterized by an interpolated-time-stamp that corresponds to the second-time-stamp, such that the interpolated-frame is temporally synchronized with the point-cloud of the second-frame;
   fuse the interpolated-frame with the second-frame to provide a fused-frame of data characterized by the interpolated-time-stamp,
   determine a three-dimensional model of an environment surrounding the host-vehicle based on the fused-frame; and
   operate the host-vehicle in accordance with the three-dimensional model of the environment.

6. The controller-circuit of claim 5, wherein the objects present in the first-field-of-view are in a travel path of the host-vehicle.

7. The controller-circuit of claim 5, wherein the objects present in the second-field-of-view are in a travel path of the host-vehicle.

8. The controller-circuit of claim 5, wherein the processor is further configured to:
   synthesize the interpolated-frame from the first-frame responsive to determining that the first-time-stamp and the subsequent-time-stamp differ from the second-time-stamp by less than five milliseconds, wherein the interpolated-frame is the same as the first-frame.

9. A method of operating a sensor data fusion system for a host-vehicle with multiple sensors, said method comprising:
   receiving a first-frame of camera data and a subsequent-frame of camera data from a camera mounted on the host-vehicle, said first-frame of camera data and said subsequent-frame of camera data indicative of objects present in a first-field-of-view, said first-frame of camera data characterized by a first-time-stamp, said subsequent-frame of camera data characterized by a subsequent-time-stamp different from the first-time-stamp;

receiving a second-frame of LiDAR data from a LiDAR mounted on the host-vehicle, said second-frame of LiDAR data indicative of objects present in a second-field-of-view that overlaps the first-field-of-view, said second-frame of LiDAR data characterized by a second-time-stamp temporally located between the first-time-stamp and the subsequent-time-stamp;

synthesizing an interpolated-frame from the first-frame and the subsequent-frame using motion flow analysis responsive to determining that both the first-time-stamp and the subsequent-time-stamp differ from the second-time-stamp by greater than a time-threshold, said interpolated-frame characterized by an interpolated-time-stamp that corresponds to the second-time-stamp, such that the interpolated-frame is temporally synchronized with the LiDAR data of the second-frame;

fusing the interpolated-frame with the second-frame to provide a fused-frame of data characterized by the interpolated-time-stamp;

determining a three-dimensional model of an environment based on the fused-frame; and operating the host-vehicle in accordance with the three-dimensional model of the environment.

10. The method of claim 9, wherein the objects present in the first-field-of-view are in a travel path of the host-vehicle.

11. The method of claim 9, wherein the objects present in the second-field-of-view are in a travel path of the host-vehicle.

12. The method of claim 9, further comprising:

synthesizing the interpolated-frame from the first-frame responsive to determining that the first-time-stamp and the subsequent-time-stamp differ from the second-time-stamp by less than five milliseconds, wherein the interpolated-frame is the same as the first-frame.

13. A sensor data fusion system for a host-vehicle with multiple sensors, said system comprising:

a LiDAR mounted on the host-vehicle, said LiDAR configured to output a first-frame of point-cloud data and a subsequent-frame of point cloud data indicative of objects present in a first-field-of-view, said first-frame of point cloud data characterized by a first-time-stamp, said subsequent-frame of point-cloud data characterized by a subsequent-time-stamp different from the first-time-stamp;

a camera mounted on the host-vehicle, said cameraconfigured to output a second-frame of camera data indicative of objects present in a second-field-of-view that overlaps the first-field-of-view, said second-frame of camera data characterized by a second-time-stamp temporally located between the first-time-stamp and the subsequent-time-stamp; and a controller-circuit in communication with the LiDAR and the camera, said controller-circuit configured to:

synthesize an interpolated-frame from the first-frame and the subsequent-frame using motion flow analysis responsive to determining that both the first-time-stamp and the subsequent-time-stamp differ from the second-time-stamp by greater than a time-threshold, said interpolated-frame characterized by an interpolated-time-stamp that corresponds to the second-time-stamp, such that the interpolated-frame is temporally synchronized with the camera data of the second-frame;

fuse the interpolated-frame with the second-frame to provide a fused-frame of data characterized by the interpolated-time-stamp;

determine a three-dimensional model of an environment surrounding the host-vehicle based on the fused-frame; and operate the host-vehicle in accordance with the three-dimensional model of the environment.

14. The system of claim 13, wherein the objects present in the first-field-of-view are in a travel path of the host-vehicle.

15. The system of claim 13, wherein the objects present in the second-field-of-view are in a travel path of the host-vehicle.

16. The system of claim 13, wherein the controller-circuit is further configured to:

synthesize the interpolated-frame from the first-frame responsive to determining that the first-time-stamp and the subsequent-time-stamp differ from the second-time-stamp by less than five milliseconds, wherein the interpolated-frame is the same as the first-frame.

* * * * *